Feb. 18, 1936.  A. C. WHITING  2,031,444
CUTTING MACHINE
Filed Jan. 19, 1935   3 Sheets-Sheet 1

WITNESSES
Edw. Thorpe
Chris Peinle

INVENTOR
Arthur C. Whiting
BY
Munn, Anderson & Liddy.
ATTORNEY

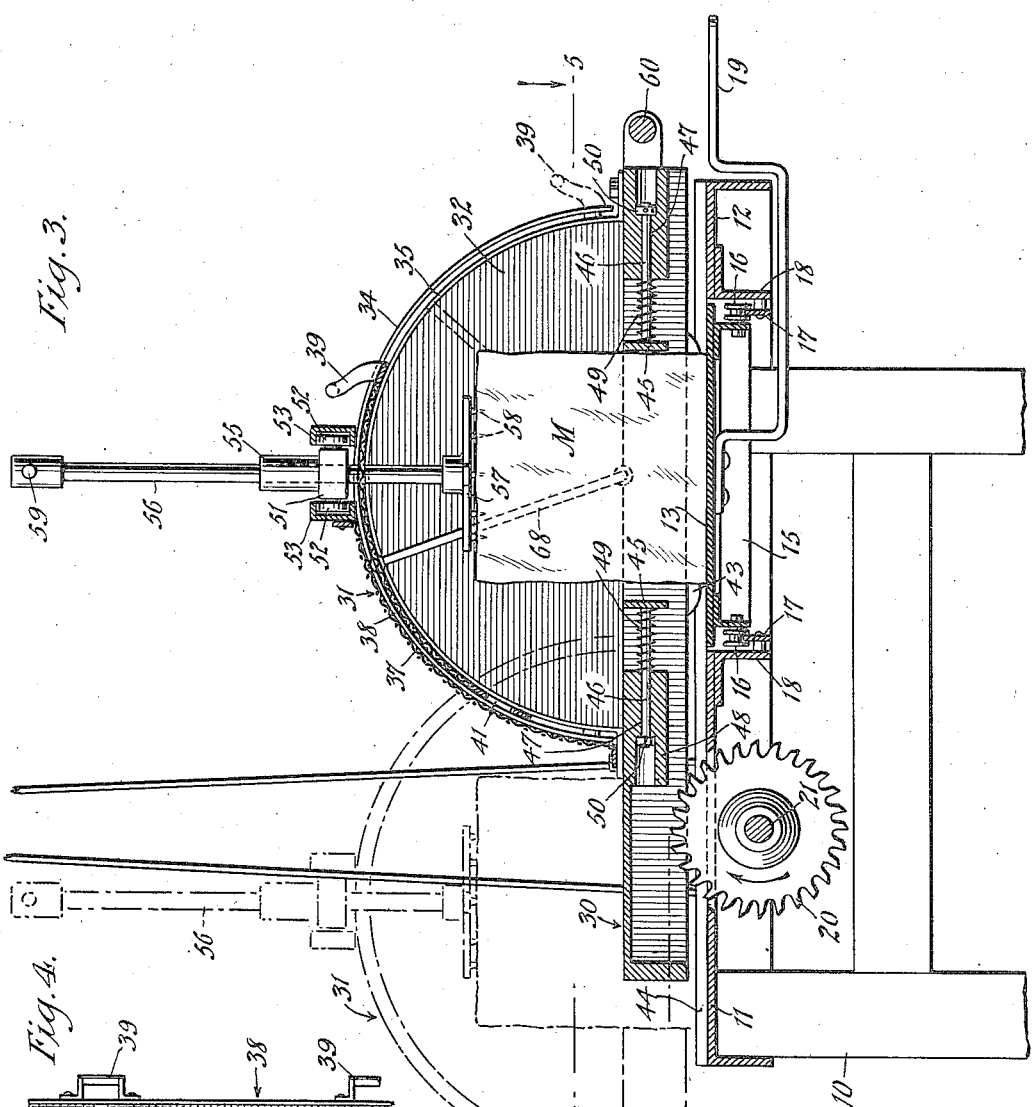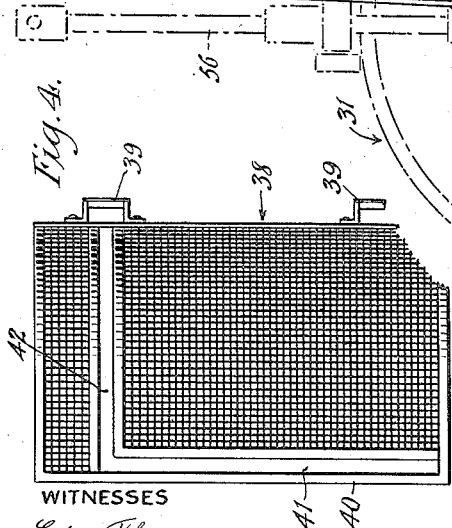

Feb. 18, 1936.  A. C. WHITING  2,031,444
CUTTING MACHINE
Filed Jan. 19, 1935  3 Sheets-Sheet 3
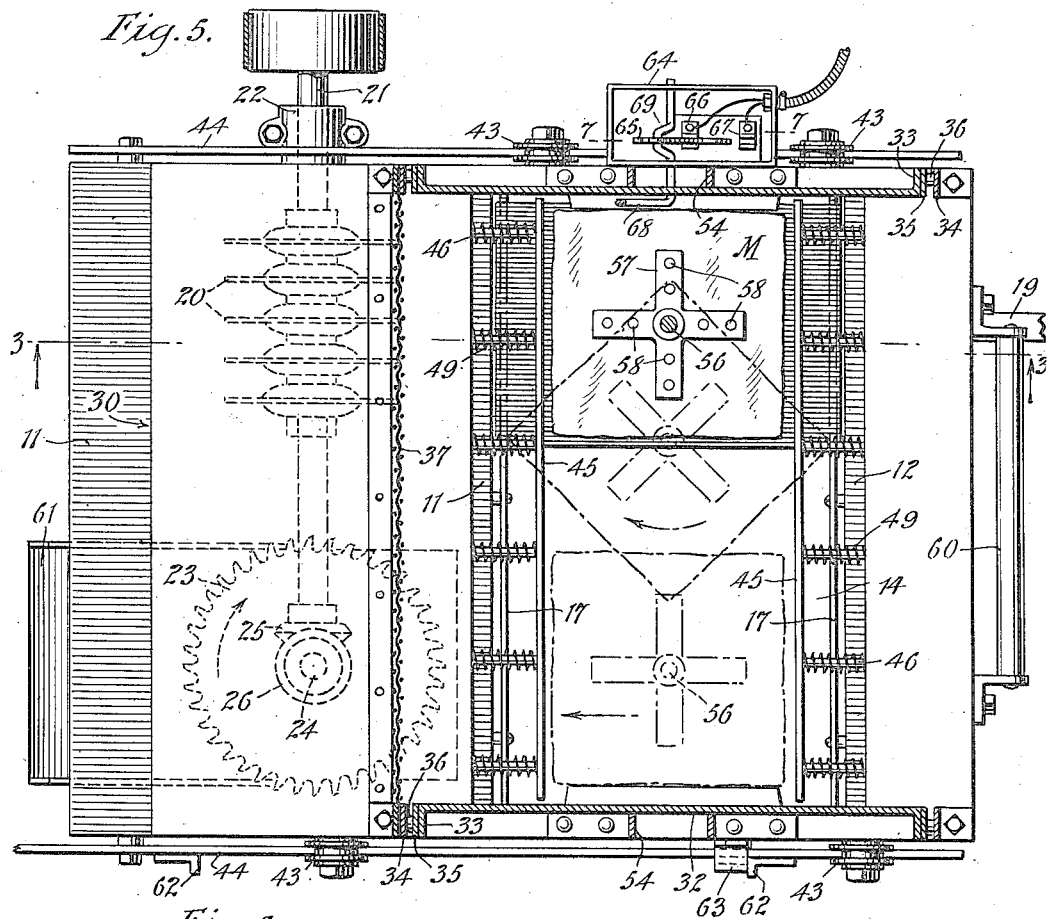
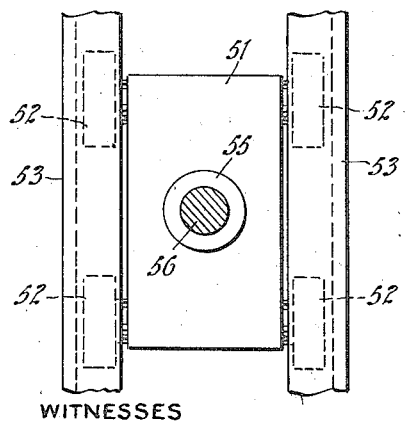
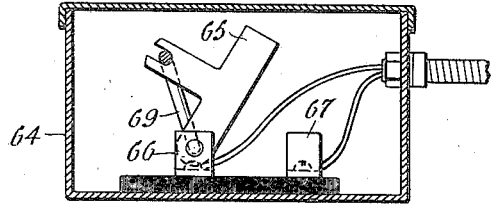
WITNESSES
Edw. Thorpe
Chris Feinle.
INVENTOR
Arthur C. Whiting
BY
Munn, Anderson & Liddy
ATTORNEY Patented Feb. 18, 1936

2,031,444

UNITED STATES PATENT OFFICE 2,031,444

CUTTING MACHINE

Arthur C. Whiting, Mount Vernon, N. Y.

Application January 19, 1935, Serial No. 2,570

20 Claims. (Cl. 143—38)

This invention relates to improvements in a machine for cutting material into pieces, of desired shapes, and said invention being advantageously applicable to a machine for cutting cubes from a block or cake of ice.

The ice cubes are desirable for icing drinks, beverages, food, and for packing preserving containers.

The principal object of the invention is the provision in a machine of the indicated character of a novel combination and arrangement of elements whereby cutting operations may be carried out without liability of injury to an operator by the cutters while they are in operation.

A further object of the invention is to equip a machine of the indicated character with means to guard the cutters thereof at all times, and which does not require an operator to handle the material or ice with bare hands in cutting it, to the end that the operator may safely carry out the desired cutting operations with the machine.

A further object of the invention is the provision in a machine of the indicated character of a movable unit which serves as a cutter guard; which provides a closure for introducing the material to be cut therein; which provides means for adjusting and holding the material, and for guiding the material to the cutters; and which provides means for preventing operation of the cutters while the closure is open, to avoid injury of an operator's hands by the cutters if the operator's hands are carelessly put into the guard, or while placing the material into the guard, and requiring the operator to shut the closure before the cutters may be put into operation.

With the foregoing, other objects of the invention will appear from the embodiment of the invention, which by way of example is described in the following specification and illustrated in the accompanying drawings, in which Fig. 1 is a perspective view of a machine embodying the features of the invention;

Fig. 3 is a longitudinal section of the machine, the section being taken on the line 3—3 of Fig. 5, portions of its table being broken away, and the movable material handling unit being shown in one position in full line, and in another position in dot-and-dash lines;

Fig. 4 is a top view of the closure element;

Fig. 5 is a plan of the machine, partly in section, the section being taken on the line 5—5 of Fig. 3;

Fig. 6 is a fragmentary detail view of certain features;

Fig. 7 is a view of the motor circuit safety switch and its housing, the latter being shown in section.

Figure 1:
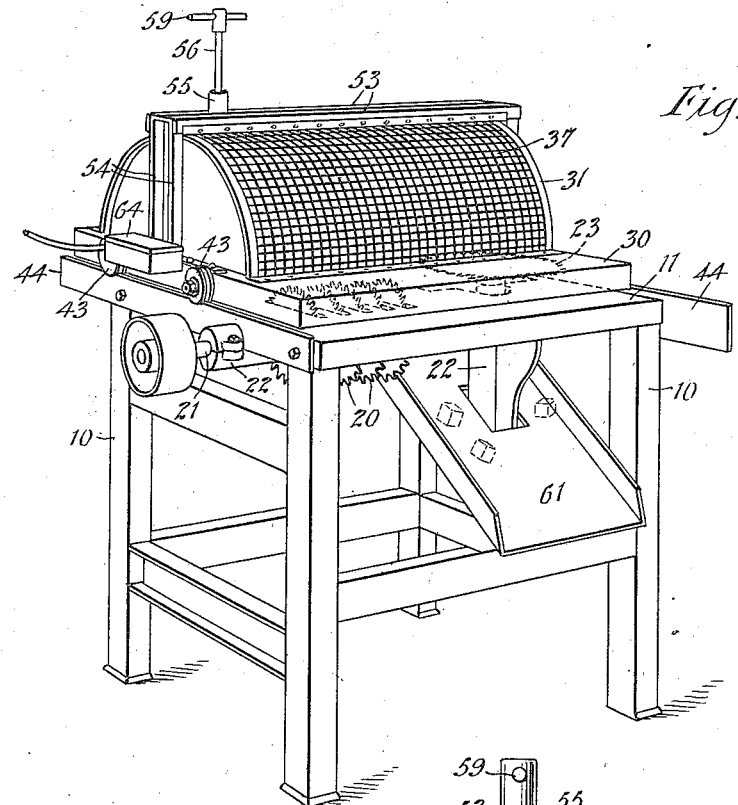
Figure 2:
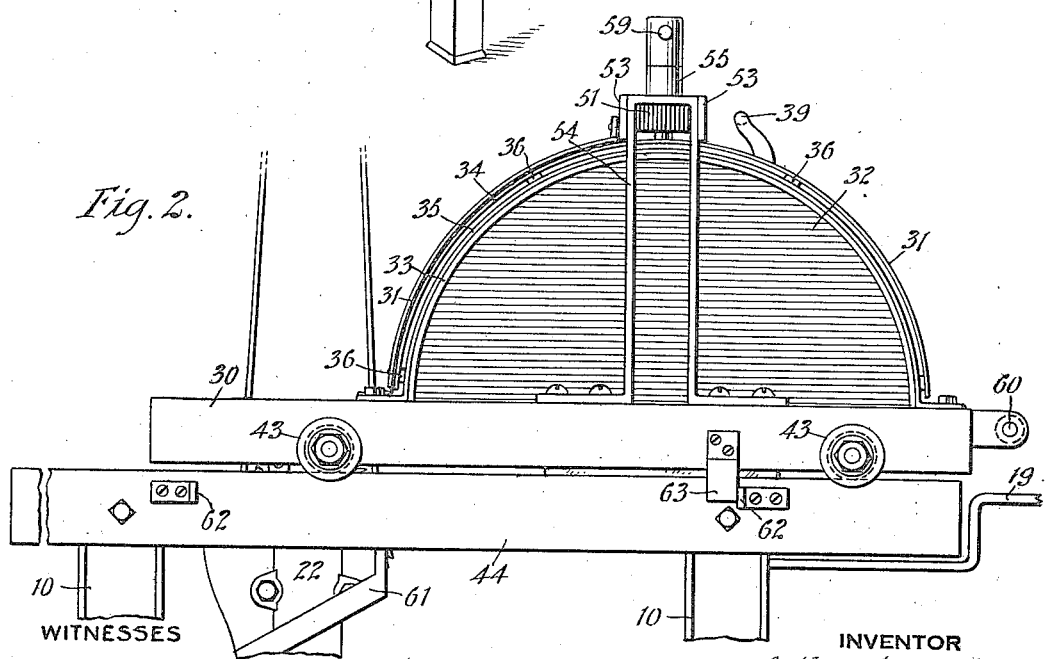
Fig. 2 is a side view of the machine, portions thereof being broken away.

Referring now to the drawings, it will be apparent the machine embodying the features of the invention includes a table 10 having a top consisting of fixed sections 11 and 12 respectively and a movable section 13. The sections 11 and 12 are flush with each other and are arranged in spaced relation to provide a rectangular opening 14 extending transversely to the table. The movable section 13 is mounted for movement crosswise of the table in the openings 14 flush with the fixed sections 11 and 12. The section 13 is approximately equal in length to the distance between the edges of the sections 11 and 12 bounding the opening 14 and is of less width than one-half the width of the table. The section 13 has a frame 15 secured to the under side thereof which carries grooved rollers 16 at each end of the section 13. The rollers 16 at each end of the section 13 travel on a rail 17 secured to the vertical flange of an angle iron 18 secured to the under side of the fixed sections 11 and 12, as the case may be. The rails 17 are disposed in parallel relation with respect to each other and are perpendicular to the longitudinal axis of the top of the table. In this manner the top section 13 is mounted for movement transversely of the table. A handle bar 19 is secured to the section 13 on the under side thereof and projects forwardly to be grasped by an operator for the purpose of moving the section 13. A gang of cutters 20 is mounted on a shaft 21 to be driven thereby. The shaft 21 is disposed horizontally and perpendicularly to the longitudinal axis of the table 10, so that each cutter 20 will cut in a plane perpendicular to the upper surface of the fixed top section 11, the latter being provided with openings to accommodate the cutters 20. Each cutter 20 projects upwardly with respect to the upper surface of the section 11 so as to produce a cut in material sliding on the section 11. Any preferred number of cutters 20 may be used, there being five in the present instance which are spaced equidistantly with respect to each other. The gang of cutters 20 occurs at one side of the longitudinal axis of the table. The shaft 21 is supported for rotation by suitable bearings 22 on the table 10. A cutter 23 is mounted on the upper end of a shaft 24 supported for rotation by one of the bearings 22. The shaft is disposed vertically, or in other words perpendicular to the upper surface of the top section 11, so that the cutter 23 will be horizontally disposed to cut in a plane parallel to the upper surface of the top section 11. The cutter 23 is disposed above the top section 11 at the side of the table opposite that having the cutters 20. Motion is transmitted to the shaft 24 from the shaft 21 through the intervention of bevel gears 25 and 26 respectively secured to the shafts 21 and 24 respectively. The shaft 21 is driven by any suitable means, preferably by an electric motor through the intervention of belt and pulleys, one of the pulleys being on the motor shaft and the other pulley on the shaft 21, with the belt encircling the pulleys.

In accordance with the invention use is made of a unit movable with respect to the top of the table, which serves as a guard for the cutters 20 and 23; which provides a closure for introducing the material to be cut therein on the top section 13; and which provides means for adjusting and holding the material and for guiding the material to the cutters. The unit includes a hollow structure 30 of rectangular formation open at the bottom approximately equal in width to the width of the table and somewhat shorter in length than the length of the table. The structure 30 constitutes a base for a semi-circular hood 31. The hood consists of semi-circular sides 32 disposed at opposite sides of the table at the top thereof. Each side 32 has a flange 33 paralleling its semi-circular edge. Semi-circular guide strips 34 and 35 are secured to the flange 33 on each side 32 in spaced relation with respect to each other by any suitable means including spacers 36. The top of the hood 31 consists of screen sections 37 and 38 respectively. The screen section 37 is of arcuate formation in cross section and rectangular in outline, and is secured in any suitable manner in fixed relation to the sides 32 in contact with the strip 34. The section 38 constitutes a closure section of arcuate formation in cross section and also rectangular in outline as shown most clearly in Fig. 4. The opposite sides of the section 38 move between the strips 34 and 35 with respect to the fixed section 37 into open and closed position. The screen section 38 has handles 39 for this purpose. The frame 40 of the screen section 38 is of such construction as to provide slots 41 and 42 respectively which communicate with each other. The slot 41 is disposed perpendicularly with respect to the longitudinal axis of the table, and the slot 42 is disposed perpendicularly to the slot 41, as shown most clearly in Fig. 4. The structure 30 has grooved rollers 43 on the opposite sides thereof which travel on a rail 44 secured to the table 10 at each side thereof. Each of the rails 44 is parallel with the longitudinal axis of the table, or in other words, each of the rails 44 is disposed perpendicular to the axis provided by the shafts 21 and 24. The unit also includes means for engaging the material to be cut to move it to the cutters in response to the movement of the structure 30 and its hood 31. The said means consists of bars 45 arranged transversely of the structure 30 in spaced relation to each other, each bar having a plurality of short guide rods 46 which are received in holes 47 in a bearing portion 48 of the structure 30. An expansion coil spring 49 surrounds each rod 46 with its opposite ends in contact with the bar 45 and the portion 48, to resiliently mount the bar 45. The bars 45 are movable toward and away from each other subject to the action of the springs 49. The movement of one of the bars 45 toward the other bar is limited by stop nuts 50 on the rods 46 thereof, said nuts 50 contacting the bearing portion 48 for this purpose. The unit also includes a device for engaging the material to be cut and for moving it from one position into another, while resting on the movable top section 13 of the table. The device includes a traveler or block 51 having rollers 52 on its opposite sides which travel on rails 53 each of which is in the form of a channel iron. The rails 53 are supported at the opposite ends by supports 54 secured to the structure 30 on the top thereof at opposite sides of the hood 31. The rails 53 are in parallel relation to each other and also parallel the slot 41 in the closure section 38 of the hood. The block 51 has an upstanding sleeve 55 to provide a bearing for a rod 56 which extends through the block 51 with its lower end projecting into the hood 31 and its upper end projecting above the hood. The lower end of the rod 56 has a spider 57 having spurs 58 which engage the material to be cut. The upper end of the rod 56 has a handle 59 to manipulate the rod. Attention is called to the fact that the rod 56 may be brought to a position in line with the slot 42 in order that the closure section 38 of the hood may be moved into its open and closed positions. When the closure section 38 is in its closed position the slot 41 will be in alinement with the rod 56, thereby permitting the rod 56 to traverse the slot 41 as supported by the block 51.

The material to be cut into pieces of the desired shape is designated M and consists of a block or cake of ice in the present instance. The block or cake of ice may be arranged on the movable top section 13 by opening the closure section 38 of the hood 31. By manipulating the handle bar 19 the section 13 may be brought to a position to direct the block or cake of ice to the cutters 20. Before this is done the closure section 38 is brought to its closed position, and the spider 57 is engaged with the ice by manipulating the rod 56 with the handle 59. By pushing on the handle 60 on the structure 30, the bar 45 to the rear of the ice will carry it toward the cutters 20 as the unit is moved in the same direction, thereby resulting in spaced parallel cuts being produced in the under side of the ice block or cake parallel to each other, of approximately a depth of one and one-half inches or any other suitable depth. The unit is then returned by exerting a pull on the handle 60 causing the ice block or cake to slide from the section 11 to the section 13, due to the engagement of the other bar 45 with the ice block or cake. By manipulating the handle 59, the rod 56 may be turned 90° to cause the spider 57 to turn the ice block or cake 90° while resting on the top section 13. By again pushing on the handle 60, to move the unit toward the cutters 20, the ice block or cake will have spaced parallel cuts produced therein perpendicular to those previously produced as will be understood. The unit may then be brought back to its original position to slide the ice cake or block onto the movable top section 13, after which the handle bar 19 may be moved to convey the ice block or cake on the top section 13 to a position in line with the cutter 23. By again pushing on the handle 60 with one hand while grasping the handle 59 with the other hand, the ice block or cake will be slid toward the cutter 23, which will cut the ice block or cake in a plane parallel to the upper surface of the top sections of the table, thereby severing cubes of ice from the block or cake, due to the fact that the cutter 23 will be disposed in the position elevated from the upper surface of the top section 11 equal to the depth of the cuts produced by the cutters 20, which depth of cut is approximately one and one-half inches as stated, to produce the cubes. The top section 11 of the table is cut out directly below the cutter 23, and a chute 61 secured in any suitable manner to the top communicates with the cut out portion of the section 11, to convey the cubes of ice to any suitable receptacle. After this severing of cubes, the unit may be returned to its original position to return the ice block or cake to the section 13 which may be moved with the handle bar 19 to position the ice block or cake in line with the cutters 20. The ice block or cake, with the exception of a small remnant, may be reduced to additional cubes by repeating the operations aforesaid.

From the foregoing it will be obvious that the structure 30 together with its hood 31 constitutes a guard for the cutters 20 and 23, and will cover these cutters at all times regardless of the position of the guard. The unit which embodies this guard has limited movement in opposite directions by stops 62 secured to one of the rails 44 in spaced relation to each other, which are engaged by an arm 63 secured to the structure 30.

In accordance with another feature of the invention means is provided for preventing the operation of the cutters 20 and 23 while the closure section 38 is open, to avoid injury to the operator's hands by the cutters, if the operator's hands are carelessly put into the hood, or while placing the ice block or cake into the hood, and requiring the operator to shut the closure section 38 before the cutter may be put into operation. The said means includes a safety switch in the motor circuit. This switch is arranged in a suitable casing 64 carried by the structure 30. The switch consists of a blade 65 pivotally connected with contacts 66 and which is movable into and out of engagement with contacts 67. The contacts 66 and 67 are mounted on a suitable base of insulating material as shown most clearly in Fig. 7. A rod 68 is connected with the closure section 38 of the hood and has a crank 69 engageable with the blade 65, the provision and the arrangement being such that when the closure section 38 of the hood is moved to its open position, the blade 65 will be moved out of engagement with the contacts 67 thereby opening the motor circuit and preventing the motor from being started. Consequently, the cutters 20 and 23 cannot be operated while the closure section 38 is in its open position. The ice block or cake may then be placed within the hood on the top section 13. It will then be necessary to move the closure section 38 to its closed position to cause the blade 65 to move into engagement with the contacts 67 to close the motor circuit, so that the motor may operate to drive the cutters. Therefore it will be obvious that cutting operations may be carried out without liability of injury to an operator by the cutters while they are in operation.

It is to be understood that the invention is not restricted to the precise arrangement of parts shown and described, and details of construction may be modified and rearranged without departing from the spirit of the invention, the scope of which is limited only by the terms of the appended claims.

I claim:

1. In an ice cube cutting machine, an arrangement of cutters and a device constituting a guard for the ice and the cutters extending over them and being movable with respect to the cutters without exposing them, said device having resilient means to engage the ice to move it in response to the movement of the device, to subject the ice to the cutting action of the cutters, said device also having manipulatable means for moving the ice from one position into another within said guard with respect to the cutters and for holding it therein.

2. In a machine of the character described, a cutter guard of hollow construction, said guard having a slot therein, said guard being mounted to travel back and forth, and a device mounted on said guard to traverse said slot and having a rod extending in said slot with its upper end projecting above the guard and its lower end projecting into the guard, said rod being manually turnable and movable up and down, and means on the lower end of the rod to engage material which is to be cut when placed within the guard, to manually change the position of the material and to retain it therein with the rod.

3. In a machine of the character described, a cutter guard of hollow construction, said guard having a straight slot therein, said guard being mounted to travel back and forth, spaced rails carried by the guard and paralleling the slot, a block having rollers movable along the rails whereby the block may traverse the slot, a rod extending through the block and having turning and up and down movement with respect thereto, said rod projecting downwardly through the slot into the guard, and the lower end of the rod having means thereon to engage material which is to be cut when placed within the guard, to change the position of the material by manipulating the rod, preparatory to the cutting of the material.

4. In a machine of the character described, a table having a horizontal top consisting of a fixed section and a movable section, means mounting the movable section for movement in opposite directions disposed flush with the fixed section, and an arrangement of cutters to cut material fed thereto while sliding on the top, certain of said cutters being rotatable on a horizontal axis, and another of said cutters being rotatable on a vertical axis, said movable section being movable while flush as aforesaid for optionally positioning the material for cutting action of the cutters having the horizontal axis or the cutter having the vertical axis.

5. In a machine of the character decribed, a table having a horizontal top consisting of a fixed section and a movable section, means mounting the movable section for movement in opposite directions disposed flush with the fixed section, an arrangement of cutters to cut material fed thereto while sliding on the top, certain of said cutters being rotatable on a horizontal axis, and another of said cutters being rotatable on a vertical axis, said movable section being movable while flush as aforesaid for optionally positioning the material for cutting action of the cutters having the horizontal axis or the cutter having the vertical axis, and means which travels with respect to the table and cutters, to slide the material as positioned, to the cutting action of the cutters.

6. In a machine of the character described, a table having a horizontal top consisting of a fixed section and a movable section, means mounting the movable section for movement in opposite directions disposed flush with the fixed section, an arrangement of cutters to cut material fed thereto while sliding on the top, certain of said cutters being rotatable on a horizontal axis, and another of said cutters being rotatable on a vertical axis, said movable section being movable while flush as aforesaid for optionally positioning the material for cutting action of the cutters having the horizontal axis or the cutter having the vertical axis, and means which travels with respect to the table and cutters, to slide the material as positioned, to the cutting action of the cutters, said means constituting a guard disposed over the cutters regardless of the position thereof with respect thereto.

7. In a machine for cutting ice cubes from a block of ice, in combination, a table on the top of which the block slides for the cutting operations, a hood mounted for reciprocation in relation to said top, transverse bars arranged within the hood in spaced relation, guide rods projecting from each bar into guide holes in the hood, and expansion springs surrounding the rods respectively of each bar between the bar and the hood, said bars being engageable with opposite sides of said block to move the latter in response to the movement of the hood.

8. In a machine for cutting a block of ice into pieces, in combination, a support for the block, an arrangement of cutters to cut the block when moved on said support, a housing mounted for movement with respect to the support and cutters, the housing being of a size to cover the block of ice and the cutters and to permit desired movement of the housing without exposing the cutters, means on the housing to engage a block of ice positioned on the support within the housing to cause the block to move with the housing, and means on the housing manipulatable to move the block from one position into another within the housing, for the purpose of subjecting the block to the cutters, to be cut thereby into pieces in response to the movement of the housing.

9. In a material cutting machine, a movable cutter guard, and manipulatable means carried by said guard for engaging the material to be cut and for moving it from one position to another within the guard and holding it therein, for the purpose of subjecting it to suitable cutters to produce cuts therein transecting each other.

10. In a material cutting machine, a movable cutter guard, said guard comprising a box-like structure open at the bottom and having a movable closure member whereby to place the material to be cut within the guard, and manipulatable means carried by said guard for engaging the material to be cut and for moving it from one position to another within the guard and holding it therein, for the purpose of subjecting it to suitable cutters to produce cuts therein transecting each other.

11. In a material cutting machine, a movable cutter guard, said guard including a screen section having a movable closure member whereby to place the material to be cut within the guard, and manipulatable means carried by said guard for engaging the material to be cut and for moving it from one position to another within the guard and holding it therein, for the purpose of subjecting it to suitable cutters to produce cuts therein transecting each other.

12. In a machine of the character described, in combination, a table, an arrangement of cutters to cut material fed thereto on the top of the table, said cutters consisting of a gang rotatable on a horizontal axis and a cutter rotatable on a vertical axis, rails on said table perpendicular to both of said axes, a hood having rollers which travel on said rails whereby the hood may be moved toward and away from said cutters, and means to limit the aforesaid movement of the hood, said hood constituting a guard disposed over the cutters regardless of the degree of movement of the hood.

13. In a machine of the character described, in combination, a table, an arrangement of cutters to cut material fed thereto on the top of the table, said cutters consisting of a gang rotatable on a horizontal axis and a cutter rotatable on a vertical axis, rails on said table perpendicular to both of said axes, a hood having rollers which travel on said rails whereby the hood may be moved toward and away from said cutters, said hood having a movable closure section for placing material to be cut on the table, and means to limit the aforesaid movement of the hood, said hood constituting a guard disposed over the cutters regardless of the degree of movement of the hood.

14. In a machine of the character described, in combination, a table, cutters mounted on said table to cut material moved in contact with the table, a hood constituting a guard for the cutters mounted on the table for movement back and forth with respect to the cutters without exposing the cutters, said hood having provision for placing material to be cut within the hood on the table, resilient means on the hood within the same to engage the material to move it as the hood is moved toward the cutters so as to cause them to cut the material, and means on the hood to engage the material to move it from one position into another, subject to the yielding action of the resilient means and reengaging of the material thereby to move the material as the hood is again moved toward the cutters, so as to cause them to cut the material crosswise to the previous cutting thereof.

15. In a machine for cutting a block into pieces, in combination, a horizontal flat fixed support and a horizontal flat movable support always flush with the fixed support, an arrangement of cutters positioned in operative relation to the fixed support, a structure mounted for reciprocation with respect to said fixed and movable supports, said structure constituting a guard extending over the cutters regardless of the degree of movement of the structure, said structure being adapted to receive therein resting on the movable support a block to be cut, while the structure is in its retracted position, said movable support being movable to change the position of the block with respect to the cutters, and means carried by said structure to turn said block while resting on said movable support, said structure being movable to move said block from the movable support onto the fixed support and with respect to the latter, to subject the block to the cutting action of the cutters, and also to return the block to said movable support.

16. In a machine for cutting a block into pieces, in combination, a movable table top section, a cutter guard movable with respect to said section and with respect to which said section is also movable, said guard being adapted to receive therein resting on said section a block to be cut, said section being movable to change the position of said block, and means carried by said guard and movable with respect thereto for the purpose of turning said block while resting on said top section.

17. In a machine for cutting a block into pieces, in combination, a movable table top section, a cutter guard movable with respect to said section and with respect to which said section is also movable, said guard being adapted to receive therein resting on said section a block to be cut, said section being movable to change the position of said block, and means carried by said guard and manually movable to engage said block to turn it while resting on said top section, and to hold the block, said means also being movable with respect to said guard while engaged with said block and while the latter is being moved by said top section.

18. In a cutting machine, in combination, independent cutters spaced laterally in the same plane, a support for the material to be cut, said support being laterally movable with respect to the cutters, a guard enclosing the cutters and the material to be cut, means for engaging the material and turning it about a vertical axis, including a part projecting exteriorly of said guard, to be grasped by the hand whereby an operator may turn and move the material without placing the hand within the guard; and means connected with said laterally movable support projecting beyond the guard, whereby the operator may move the support and material supported thereon laterally without placing the hand within said guard, and said guard being movable with the material to bring the same into contact with the cutters.

19. In an ice cube cutting machine, an arrangement of cutters, a movable guard at all times enclosing the cutters and a block of ice to be cut, and means carried by the guard and movable with respect thereto and extending interiorly thereof to engage said block of ice, whereby manipulation of said means will change the position of said block within the guard, and will also cause the block to move in response to the movement of the guard, for the purpose of subjecting the block to said cutters to cut it into cubes.

20. In an ice cube cutting machine, independent power driven cutters spaced laterally with relation to each other, a movable cutter guard at all times enclosing the cutters and the ice to be cut, and means to move said guard and the ice to be cut manually operable exteriorly of the guard to subject the ice to the action of the cutters, said guard being provided with a movable section to permit the insertion of the ice to be cut.

ARTHUR C. WHITING.